Aug. 10, 1954
J. A. LASATER
2,685,834
MOLD MARKING APPARATUS
Filed Jan. 18, 1951
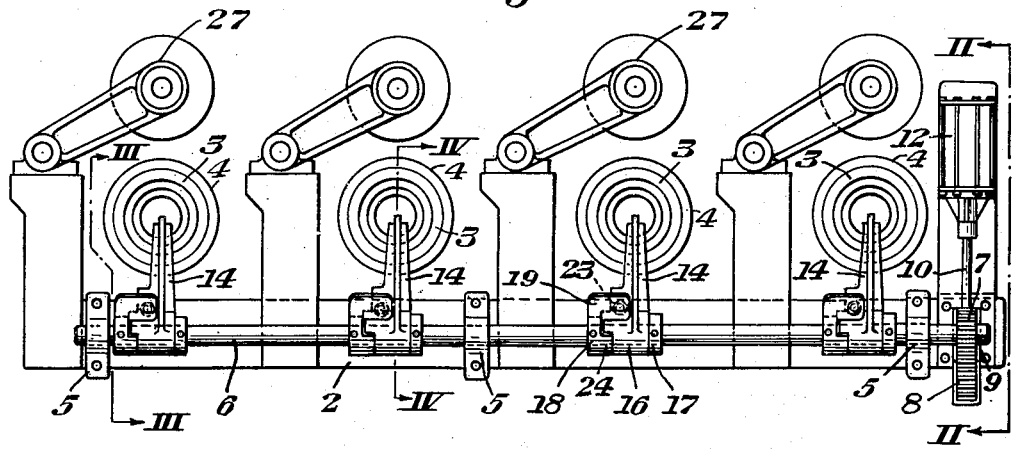
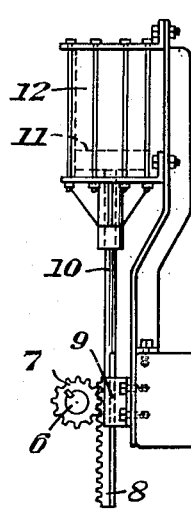
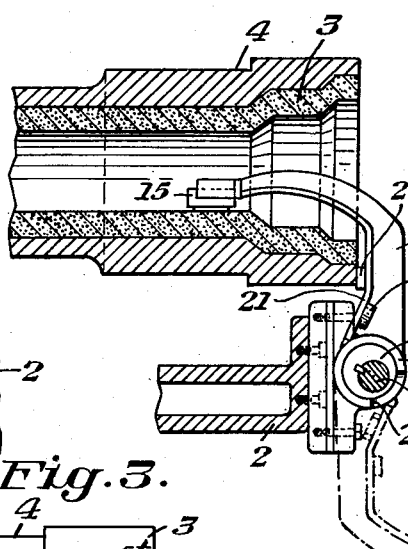
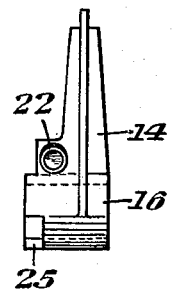
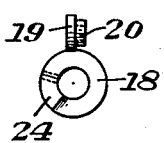
INVENTOR
John Albert Lasater Patented Aug. 10, 1954

2,685,834

UNITED STATES PATENT OFFICE 2,685,834

MOLD MARKING APPARATUS

John Albert Lasater, Chattanooga, Tenn., assignor to Herman Pneumatic Machine Company, Pittsburgh, Pa., a corporation of Pennsylvania Application January 18, 1951, Serial No. 206,690

20 Claims. (Cl. 101—4)

This invention relates to mold marking apparatus. It relates particularly to apparatus for marking molds made of mold forming material such as sand, graphite or similar finely divided material held together by a suitable binder. The marking made in each mold by my apparatus is in the form of an indentation so that a casting formed in the mold will have a surface projection conforming to the indentation in the mold, which surface projection may serve as a trade-mark or other identifying mark.

While my mold marking apparatus is of general application to molds made of mold forming material of the general type above referred to, I shall for purposes of explanation and illustration describe the invention as embodied in apparatus for applying a marking to the interior of a hollow mold and more specifically apparatus for applying markings to the interiors of a series of hollow molds arranged in generally side-by-side relationship.

My invention is adaptable to apparatus of the type shown in Patent No. 2,449,900 and in copending application Serial No. 80,847, now Patent No. 2,613,410, filed March 11, 1949. The patent referred to discloses a flask in which a mold of mold forming material is formed, the flask being spun to centrifugally cast a pipe section in the mold. A core is provided which is applied to the end of the mold where the bell end of the pipe is to be formed. The application referred to discloses mechanism including a plurality of flasks containing molds arranged in generally side-by-side relationship with a core holder for each mold on which a core is held and means for moving the core holder to position the core in cooperative relationship with the mold and to remove the core therefrom to a position to render the mold or flask accessible generally axially thereof. The application discloses means for manipulating cores for the plurality of molds simultaneously.

Since the present invention is concerned solely with the marking of molds which have been formed out of mold forming material whereby to apply to castings formed in the molds trademarks or other identifying indicia I shall not describe in detail the portions of the apparatus with which the invention is not concerned or the steps of forming the molds. The above mentioned patent and application fully disclose the mold forming method and apparatus.

I provide mold marking apparatus comprising a marking member, mounting means for the marking member, means engaging the marking member moving the marking member upon the mounting means into position adjacent a mold and means engaging the marking member moving the marking member toward the mold to engage and mark the mold. Desirably the marking member is carried by the mounting means for turning movement into position adjacent the mold. Stop means are preferably provided stopping the turning of the marking member. Means are preferably provided engaging the marking member moving the marking member, after stopping of the turning thereof, toward the mold to engage and mark the mold.

My mold marking apparatus preferably comprises an eccentric, a marking member having a portion disposed about the eccentric, means for turning the eccentric and means connected with the eccentric and the marking member insuring turning of the marking member with the eccentric during a portion of the turning movement of the eccentric to turn the marking member into position adjacent a mold, further turning of the eccentric moving the marking member toward the mold to engage and mark the mold. When the apparatus is employed for applying a marking to the interior of a hollow mold, as in the apparatus shown in the drawings, the marking member is swung into the hollow mold and then moved toward the mold to engage and mark the mold.

Resilient means are preferably provided which are connected with the eccentric and the marking member insuring turning of the marking member with the eccentric during a portion of the turning movement of the eccentric to turn the marking member into position adjacent the mold. As the marking member is thereafter moved toward the mold to engage and mark the mold the resilient means is deformed. The parts are preferably so constructed and arranged that turning of the eccentric after the marking member has been brought into position adjacent the mold is through an angle less than 90° and the major axis of the eccentric at the beginning of the turning thereof is disposed generally transversely of the direction of movement of the marking member toward the mold to engage and mark the mold.

I preferably provide means connected with the eccentric positively engaging a portion of the marking member upon reverse turning of the eccentric to move the marking member away from the mold after marking the mold, said means insuring turning of the marking member out of position adjacent the mold to clear the mold.

My mold marking apparatus preferably comprises a shaft, a marking member mounted on the shaft for turning movement into position adjacent a mold and means engaging the marking member moving the marking member toward the mold to engage and mark the mold. There is preferably mounted on the shaft, in addition to the eccentric above referred to, a collar which like the eccentric is turnable with the shaft, the collar and the marking member having circumferentially opposed portions, and the resilient means above referred to are preferably interposed between said portions.

My mold marking apparatus when adapted for marking a series of molds arranged in generally side-by-side relationship preferably comprises a shaft extending generally parallel to the series of molds, eccentrics on the shaft and turnable therewith, one of the eccentrics being generally opposite each of the molds, marking members, one for each mold, each marking member having a portion disposed about the eccentric generally opposite the mold which it is to mark, means for turning the shaft and means connected with the shaft and the respective marking members insuring turning of the marking members with the shaft during a portion of the turning movement of the shaft to turn the marking members respectively into positions adjacent the respective molds which they are to mark, further turning of the shaft being accompanied by turning movement of the eccentrics relatively to the respective marking members to move the marking members toward the molds to engage and mark the molds. The means for turning the shaft desirably includes a pinion on the shaft and turnable therewith, a rack meshing with the pinion and means, such, for example, as a piston operated by fluid pressure in a cylinder, for moving the rack to turn the pinion.

Other details, objects and advantages of the invention will become apparent as the following description of a present preferred embodiment thereof proceeds.

In the accompanying drawings I have shown a present preferred embodiment of the invention in which:

Figure 1 is an end view of mold forming apparatus to which my mold marking apparatus is applied;

Figure 2 is an enlarged end view of my mold marking apparatus, taken on the line II—II of Figure 1;

Figure 3 is an enlarged fragmentary view partly in elevation and partly in transverse cross section on the line III—III of Figure 1;

Figure 4 is an enlarged fragmentary transverse cross-sectional view on the line IV—IV of Figure 1 through a mold and apparatus for marking the mold;

Figure 5 is an edge view of one of the marking members;

Figure 6 is a face view of one of the collars; and

Figure 7 is an edge view of one of the collars.

Referring now more particularly to the drawings, there is provided a support or base designated generally by reference numeral 2 in which four hollow pipe molds arranged in side-by-side relationship are rotatively mounted. Each mold is designated by reference numeral 3 and is formed within a steel flask 4 by forming and compacting mold forming material. As indicated above the apparatus is of the type shown in Patent No. 2,449,900 and in copending application Serial No. 80,847 now Patent No. 2,613,410, and will not be described in detail.

My mold marking apparatus comprises bearings 5 carried by the supporting structure in which is rotatively mounted a shaft 6 extending generally parallel to the series of hollow molds 3. At one end the shaft 6 has keyed thereto a pinion 7 which meshes with a rack 8 movable up and down in a guide 9 opposite the pinion 7. The rack 8 is connected with the piston rod 10 of a piston 11 operating in a fluid pressure cylinder 12 mounted on the supporting structure. Movement of the piston 11 downwardly in the cylinder 12 turns the shaft 6 in one direction and movement of the piston upwardly turns the shaft in the opposite direction.

Keyed to the shaft 6 in approximately the vertical plane containing the axis of each of the molds 3 is an eccentric or cam 13. Mechanism now to be described is employed in connection with each of the four eccentrics for marking the adjacent mold. The mechanism for marking the four molds is the same for each so it need be described only once, the following description applying to the mechanism for marking each or any of the four molds.

There is provided a marking member 14 of generally L shape carrying at one extremity a marking die 15 adapted to be moved toward the corresponding mold 3 to engage and mark the mold at the interior thereof. When the die is pressed against the mold it forms an indentation in the mold which upon casting of a pipe in the mold forms on the outside of the pipe a raised identifying marking.

The marking member 14 has a hollow hub 16 disposed about the eccentric 13. The marking member 14 is freely turnable upon the eccentric 13. Pinned to the shaft 6 at one side of the eccentric and marking member is a plain collar 17 to maintain the eccentric and marking member in proper position axially of the shaft. Pinned to the shaft 6 at the opposite side of the eccentric and marking member is a collar 18 having an arm 19 projecting therefrom generally parallel to the axis of the shaft. On the arm 19 is a centering hub 20. The centering hub 20 is circumferentially opposed to a portion 21 of the marking member 14 which also has a centering hub 22. A compression coil spring 23 is centered between hubs 20 and 22 and maintained in compression between the arm 19 of the collar 18 and the portion 21 of the marking member 14.

It being remembered that the collar 18 is pinned to the shaft, turning movement of the marking member 14 about the eccentric 13 in the direction in which the marking member is urged to turn by the spring 23 is limited by engagement of a lug 24 on the collar 18 with a shoulder 25 on the hub 16, the lug 24 and the shoulder 25 being circumferentially opposed. The marking member 14 has a stop member 26 which when the marking member is moved from the chain line position to the solid line position of Figure 4 engages the end of flask 4 as shown in the solid line position.

Having described the mechanism of my mold marking apparatus I shall now describe its operation. When the piston 11 is at the upper end of its stroke the marking member is in the chain line position of Figure 4 (this is of course true of all four of the marking members but for simplicity of explanation the singular will be used). Fluid pressure is admitted above the piston 11 in the cylinder 12 forcing the piston downwardly and through the rack 8 turning the pinion 7 and the shaft 6 in the clockwise direction viewing Figure 2. The eccentric 13 turns with the shaft 6 since it is keyed thereto. The collar 18 also turns with the shaft 6 since it is pinned thereto. As the shaft turns the spring 23 is compressed between the arm 19 of the collar 18 and the portion 21 of the marking member. The spring after being somewhat compressed forces the marking member to turn in the counter-clockwise direction about the eccentric 13 viewing Figure 4 from the chain line position to the solid line position until the stop member 26 strikes against the end of the flask 4. Thus the marking member is swung into the hollow mold and the die 15 is positioned adjacent the mold ready to mark the mold by being pressed downwardly viewing Figure 4 against the material of which the mold is made.

While the marking member 14 is being swung from the chain line position to the solid line position of Figure 4 the eccentric 13 is also turning with the shaft 6. When the stop member 26 engages the end of the flask the major axis of the eccentric is disposed generally horizontally; actually, as shown in Figure 4, it is inclined somewhat to the horizontal. After the stop member 26 engages the end of the flask the turning or swinging movement of the marking member 14 into the mold is stopped. Continued turning of the shaft 6 with consequent turning of the collar 18 which is pinned to the shaft 6 results in compression of the spring 23. At the same time the eccentric 13 turns through an angle less than 90°, preferably until its major axis passes somewhat beyond a horizontal position. Such turning of the eccentric causes generally downward movement of the marking member 14, the stop member 26 being pressed firmly against the end of the flask and riding downwardly against the end surface of the flask. Turning movement of the shaft and the eccentric stops when the piston 11 reaches the bottom of its stroke in the cylinder 12. At that time the die 15 has been pressed into the material of the mold 3 to mark the mold. The spring 23 is under rather heavy compression between the arm 19 of the collar 18 and the portion 21 of the marking member 14.

When fluid is admitted below the piston 11 in the cylinder 12 the shaft 6 is turned in the counterclockwise direction viewing Figure 2. This turns the collar 18 and eccentric 13 in the clockwise direction viewing Figure 4. Turning of the eccentric 13 raises the marking member 14 generally upwardly so that the die 15 is disengaged from the material of the mold 3. Since during the disengaging motion of the die 15 the eccentric 13 is turning through a small angle from a position in which its major axis is inclined slightly downwardly toward the left viewing Figure 4 through a position in which its major axis is horizontal to a position in which its major axis is inclined slightly upwardly toward the left as actually shown in Figure 4 there is a negligible amount of sidewise or horizontal movement of the hub 16 of the marking member 14 and for practical purposes the marking member rises vertically. The non-vertical movement of the die prior to disengagement with the material of the mold is so slight that the impression made in the mold by the die is not substantially defaced. Of course the die follows the same path on the impression stroke as on the return stroke.

During the upward movement of the marking member 14 while the die 15 is being disengaged from the mold the spring 23 maintains the stop member 26 in contact with the end of the flask 4. During such time the collar 18 is turning in the clockwise direction viewing Figures 3 and 4 and the compressive force to which the spring 23 is subjected is diminishing since the arm 19 of the collar 18 is moving away from the portion 21 of the marking member 14. When the lug 24 engages the shoulder 25 of the hub 16 turning movement of the marking member 14 in the clockwise direction viewing Figure 4 from the full line position of the marking member is positively commenced. The shaft 6 continues to turn until the marking member reaches the chain line position of Figure 4 at which time the piston 11 is at the upper end of its stroke in the cylinder 12 and the cycle has been completed.

The lug 24 positively engages the hub 16 only when the marking member 14 is being moved from the full line position toward the chain line position of Figure 4. When the marking member 14 is being moved in the opposite direction the lug 24 does not positively engage the hub 16, the only force exerted between the collar 18 and the marking member 14 being that which is transmitted through the spring 23. When the piston 11 is at the lower end of its stroke in the cylinder 12 the spring 23 is under maximum compression but still the lug 24 does not engage the hub 16 but is spaced slightly therefrom circumferentially as shown in Figure 1.

My mold marking apparatus is characterized by simplicity, ruggedness, low cost of manufacture, reliability in operation and low up-keep cost. It effectively marks the interiors of pipe molds so that pipes cast in the molds will bear integral cast markings on their outer surfaces. The marking members 14 when in inoperative position are clear of the molds and flasks and do not interfere with the other operations performed in making the molds and casting the pipes therein. Such other operations are described in Patent No. 2,449,900 and copending application Serial No. 80,847 and since they form no part of my invention will not be herein described. It may be remarked, however, that Figure 1 in addition to showing the flasks and molds also shows diagrammatically core holders designated generally by reference numeral 27 which may be like the core holders shown in application Serial No. 80,847.

While I have shown and described a present preferred embodiment of the invention it is to be distinctly understood that the invention is not limited thereto but may be otherwise variously embodied within the scope of the following claims.

I claim:

1. Mold marking apparatus comprising a marking member, mounting means for the marking member, means engaging the marking member moving the marking member upon the mounting means into position adjacent a mold, stop means having an operative face stopping the marking member in that position and means engaging the marking member moving the marking member generally parallel and relatively to the operative face of the stop means toward the mold to engage and mark the mold.

2. Mold marking apparatus comprising mounting means, a marking member carried by the mounting means for turning movement into position adjacent a mold, means for turning the marking member into position adjacent a mold, stop means having an operative face stopping said turning of the marking member and means engaging the marking member moving the marking member, after stopping of said turning thereof, generally parallel and relatively to the operative face of the stop means toward the mold to engage and mark the mold.

3. Mold marking apparatus comprising a shaft, an eccentric thereon and a marking member mounted on the eccentric for turning movement therewith into position adjacent a mold, the eccentric thereafter being turnable relatively to the marking member to press the marking member against the mold to mark the mold.

4. Mold marking apparatus comprising a turnable eccentric, a marking member having a portion disposed about the eccentric, means connected with the marking member, means connected with the eccentric, said respective means being relatively positioned so that the latter exerts force against the former during a portion of the turning movement of the eccentric to turn the marking member into position adjacent a mold, and means stopping such turning of the marking member so that turning of the eccentric after stopping of such turning of the marking member moves the marking member toward the mold to engage and mark the mold.

5. Mold marking apparatus comprising a turnable eccentric a marking member having a portion disposed about the eccentric, means connected with the marking member, means connected with the eccentric, said respective means being relatively positioned so that the latter exerts force against the former during a portion of the turning movement of the eccentric to turn the marking member into position adjacent a mold, and stop means connected with the mold stopping said turning movement of the marking member when it reaches said position, further turning of the eccentric moving the marking member toward the mold to engage and mark the mold.

6. Apparatus for applying a marking to the interior of a hollow mold comprising a turnable eccentric, a marking member having a portion disposed about the eccentric, means connected with the marking member, means connected with the eccentric, said respective means being relatively positioned so that the latter exerts force against the former during a portion of the turning movement of the eccentric to swing the marking member into the hollow mold, and stop means stopping said swinging movement of the marking member, further turning of the eccentric moving the marking member toward the mold to engage and mark the mold.

7. Apparatus for applying a marking to the interior of a hollow mold comprising a generally L-shaped marking member, means for swinging the marking member so that one leg thereof enters the hollow mold, stop means stopping said swinging movement of the marking member and means for moving the marking member after being stopped generally normal to said leg toward the mold to engage and mark the mold.

8. Mold marking apparatus comprising a turnable eccentric, a marking member having a portion disposed about the eccentric, means connected with the marking member, means including resilient means connected with the eccentric, said respective means being relatively positioned so that the latter exerts force against the former through the resilient means during a portion of the turning movement of the eccentric to turn the marking member into position adjacent a mold, and stop means stopping said turning movement of the marking member when it reaches said position, further turning of the eccentric deforming said resilient means and moving the marking member toward the mold to engage and mark the mold.

9. Mold marking apparatus comprising a turnable eccentric, a marking member having a portion disposed about the eccentric, means connected with the marking member, means including resilient means connected with the eccentric, said respective means being relatively positioned so that the latter exerts force against the former through the resilient means during a portion of the turning movement of the eccentric to turn the marking member into position adjacent a mold, and stop means stopping said turning movement of the marking member when it reaches said position, further turning of the eccentric deforming said resilient means and moving the marking member toward the mold to engage and mark the mold, the parts being so constructed and arranged that said further turning of the eccentric is through an angle less than 90° and the major axis of the eccentric at the beginning of said turning thereof is disposed generally transversely of the direction of movement of the marking member toward the mold to engage and mark the mold.

10. Mold marking apparatus comprising a turnable eccentric, a marking member having a portion disposed about the eccentric, means connected with the marking member, means including resilient means connected with the eccentric, said respective means being relatively positioned so that the latter exerts force against the former through the resilient means during a portion of the turning movement of the eccentric to turn the marking member into position adjacent a mold, stop means stopping said turning movement of the marking member when it reaches said position, further turning of the eccentric deforming said resilient means and moving the marking member toward the mold to engage and mark the mold, and means connected with the eccentric positively engaging a portion of the marking member upon reverse turning of the eccentric to move the marking member away from the mold after marking the mold, said last mentioned means insuring turning of the marking member out of position adjacent the mold to clear the mold.

11. Mold marking apparatus comprising a turnable shaft, an eccentric on the shaft and turnable therewith, a marking member having a portion disposed about the eccentric, means connected with the marking member, means connected with the shaft, said respective means being relatively positioned so that the latter exerts force against the former during a portion of the turning movement of the shaft to turn the marking member into position adjacent a mold, and stop means stopping the marking member in that position, further turning of the shaft being accompanied by turning movement of the eccentric relatively to the marking member to move the marking member toward the mold to engage and mark the mold.

12. Mold marking apparatus comprising a shaft, an eccentric on the shaft and turnable therewith, a marking member having a portion disposed about the eccentric, means for turning the shaft, a collar on the shaft and turnable therewith, the collar and the marking member having circumferentially opposed portions, resilient means interposed between said portions so that the marking member is through the resilient means turned with the shaft during a portion of the turning movement of the shaft to turn the marking member into position adjacent a mold, and stop means stopping the marking member in that position, further turning of the shaft being accompanied by turning movement of the eccentric relatively to the marking member to move the marking member toward the mold to engage and mark the mold and by deformation of the resilient means.

13. Mold marking apparatus comprising a shaft, an eccentric on the shaft and turnable therewith, a marking member having a portion disposed about the eccentric, means for turning the shaft, a collar on the shaft and turnable therewith, the collar and the marking member having circumferentially opposed portions, resilient means interposed between said portions so that the marking member is through the resilient means turned with the shaft during a portion of the turning movement of the shaft to turn the marking member into position adjacent a mold and stop means stopping said turning movement of the marking member when it reaches said position, further turning of the shaft being accompanied by turning movement of the eccentric relative to the marking member to move the marking member toward the mold to engage and mark the mold and by deformation of the resilient means.

14. Mold marking apparatus comprising a shaft, an eccentric on the shaft and turnable therewith, a marking member having a portion disposed about the eccentric, means for turning the shaft, a collar on the shaft and turnable therewith, the collar and the marking member having circumferentially opposed portions, resilient means interposed between said portions so that the marking member is through the resilient means turned with the shaft during a portion of the turning movement of the shaft to turn the marking member into position adjacent a mold, stop means stopping said turning movement of the marking member when it reaches said position, further turning of the shaft being accompanied by turning movement of the eccentric relative to the marking member to move the marking member toward the mold to engage and mark the mold and by deformation of the resilient means, and means carried by the collar positively engaging a portion of the marking member upon reverse turning of the shaft and eccentric to move the marking member away from the mold after marking the mold, said last mentioned means insuring turning of the marking member out of position adjacent the mold to clear the mold.

15. Mold marking apparatus comprising a shaft, an eccentric on the shaft and turnable therewith, a marking member having a portion disposed about the eccentric, means for turning the shaft, a collar on the shaft and turnable therewith, the collar and the marking member having projections disposed in circumferentially opposed relation to each other, a coil spring interposed between said projections so that the marking member is through the coil spring turned with the shaft during a portion of the turning movement of the shaft to turn the marking member into position adjacent a mold, stop means stopping said turning movement of the marking member when it reaches said position, further turning of the shaft being accompanied by turning movement of the eccentric relatively to the marking member to move the marking member toward the mold to engage and mark the mold and by compression of the coil spring, and a lug carried by the collar positively engaging a portion of the marking member upon reverse turning of the shaft and eccentric to move the marking member away from the mold after marking the mold, the lug insuring turning of the marking member out of position adjacent the mold to clear the mold and also insuring maintaining of the coil spring under some compression between said projections.

16. Mold marking apparatus comprising a shaft, an eccentric on the shaft and turnable therewith, a marking member having a portion disposed about the eccentric, means for turning the shaft, said means including a pinion on the shaft and turnable therewith, a rack meshing with the pinion and means for moving the rack to turn the pinion, means connected with the shaft and the marking member insuring turning of the marking member with the shaft during a portion of the turning movement of the shaft to turn the marking member into position adjacent a mold, and stop means stopping the marking member in that position, further turning of the shaft being accompanied by turning movement of the eccentric relatively to the marking member to move the marking member toward the mold to engage and mark the mold.

17. Mold marking apparatus for marking a series of molds arranged in generally side-by-side relationship comprising a shaft extending generally parallel to the series of molds, eccentrics on the shaft and turnable therewith, one of the eccentrics being generally opposite each of the molds, marking members, one for each mold, each marking member having a portion disposed about the eccentric generally opposite the mold which it is to mark, means for turning the shaft, means connected with the shaft and the respective marking members insuring turning of the marking members with the shaft during a portion of the turning movement of the shaft to turn the marking members respectively into positions adjacent the respective molds which they are to mark and stop means stopping the marking members in those positions, further turning of the shaft being accompanied by turning movement of the eccentrics relatively to the respective marking members to move the marking members toward the molds to engage and mark the molds.

18. Apparatus for applying marks to the interiors of a series of hollow molds arranged in generally side-by-side relationship comprising a shaft extending generally parallel to the series of hollow molds, eccentrics on the shaft and turnable therewith, one of the eccentrics being generally opposite each of the hollow molds, marking members, one for each hollow mold, each marking member having a portion disposed about the eccentric generally opposite the hollow mold which it is to mark, means for turning the shaft and means connected with the shaft and the respective marking members insuring swinging of the marking members into the respective hollow molds which they are to mark during a portion of the turning movement of the shaft and stop means stopping said swinging movement of the marking members, further turning of the shaft after the marking members have been thus stopped being accompanied by turning movement of the eccentrics relatively to the respective marking members to move the marking members toward the molds to engage and mark the molds.

19. Apparatus for applying marks to the interiors of a series of hollow molds arranged in generally side-by-side relationship comprising a shaft extending generally parallel to the series of hollow molds, eccentrics on the shaft and turnable therewith, one of the eccentrics being generally opposite each of the hollow molds, marking members, one for each hollow mold, each marking member having a portion disposed about the eccentric generally opposite the hollow mold which it is to mark, means for turning the shaft, collars on the shaft and turnable therewith, one of the collars being disposed adjacent each of the marking members, each collar and the adjacent marking member having projections disposed in circumferentially opposed relationship to each other, a coil spring interposed between said projections of each adjacent collar and marking member so that each marking member is through the corresponding coil spring turned with the shaft during a portion of the turning movement of the shaft to swing the marking member into the hollow mold which it is to mark, stop means stopping said swinging movement of the marking members, further turning of the shaft after the marking members have been thus stopped being accompanied by turning movement of the eccentrics relatively to the respective marking members to move the marking members toward the hollow molds to engage and mark the hollow molds and by compression of the coil springs, and a lug carried by each collar positively engaging a portion of the corresponding marking member upon reverse turning of the shaft and eccentrics to move the marking members away from the hollow molds after marking the hollow molds, the lugs insuring swinging of the marking members out of the respective hollow molds and also insuring maintaining of the coil springs under some compression between said projections.

20. Mold marking apparatus comprising mounting means, a marking member carried by the mounting means for turning movement about an axis into position adjacent a mold, stop means in the path of the marking member engaged by the marking member after predetermined turning movement thereof about said said axis toward the mold and positively limiting turning movement of the marking member about said axis toward the mold and means moving the mounting means while the marking member is in engagement with the stop means to generally rectilinearly translate the marking member transversely of the direction of said turning movement toward the mold to engage and mark the mold.

References Cited in the file of this patent
UNITED STATES PATENTS

| Number | Name | Date |
|---|---|---|
| 664,011 | Beresford | Dec. 18, 1900 |
| 904,075 | Meehan | Nov. 17, 1908 |
| 1,574,367 | Commander | Feb. 23, 1926 |
| 1,599,917 | E. O'Hara | Sept. 14, 1926 |
| 1,599,918 | S. O'Hara | Sept. 14, 1926 |
| 1,780,890 | Haupt | Nov. 4, 1930 |
| 1,940,691 | Neff et al. | Dec. 26, 1933 |
| 1,953,736 | Wickwire | Apr. 3, 1934 |
| 2,002,395 | Hess | May 21, 1935 |
| 2,242,104 | Boyer | May 13, 1941 |
| 2,267,915 | Henry | Dec. 30, 1941 |
| 2,429,496 | Sutter | Oct. 21, 1947 |